(12) United States Patent
Ihrke et al.

(10) Patent No.: US 9,067,325 B2
(45) Date of Patent: Jun. 30, 2015

(54) HUMAN GRASP ASSIST DEVICE SOFT GOODS

(75) Inventors: Chris A. Ihrke, Hartland, MI (US); Donald R. Davis, Novi, MI (US); Douglas Martin Linn, White Lake, MI (US); Bryan Bergelin, Houston, TX (US); Lyndon B. J. Bridgwater, Friendswood, TX (US); Heather Bibby, Houston, TX (US); Judy Schroeder, Houston, TX (US); Craig Erkkila, Houston, TX (US)

(73) Assignees: GM Global Technology Operations LLC, Detroit, MI (US); The United States of America As Represented by the Administrator of the National Aeronautics and Space Administration, Washington, DC (US)

( * ) Notice: Subject to any disclaimer, the term of this patent is extended or adjusted under 35 U.S.C. 154(b) by 791 days.

(21) Appl. No.: 13/408,668

(22) Filed: Feb. 29, 2012

(65) Prior Publication Data
US 2013/0219586 A1 Aug. 29, 2013

(51) Int. Cl.
| | |
|---|---|
| *G06F 7/00* | (2006.01) |
| *A61H 1/00* | (2006.01) |
| *A63B 23/16* | (2006.01) |
| *B25J 15/08* | (2006.01) |
| *B25J 15/02* | (2006.01) |
| *A41D 19/015* | (2006.01) |
| *A41D 19/00* | (2006.01) |

(52) U.S. Cl.
CPC ........ *B25J 15/08* (2013.01); *B25J 15/02* (2013.01); *A41D 19/01547* (2013.01); *A41D 19/01582* (2013.01); *A41D 19/0024* (2013.01)

(58) Field of Classification Search
None
See application file for complete search history.

(56) References Cited

U.S. PATENT DOCUMENTS

| | | | |
|---|---|---|---|
| 5,117,700 | A | 6/1992 | Trechsel |
| 5,184,319 | A | 2/1993 | Kramer |
| 5,845,540 | A | 12/1998 | Rosheim |
| 5,967,580 | A | 10/1999 | Rosheim |
| 6,658,962 | B1 | 12/2003 | Rosheim |
| 7,784,363 | B2 | 8/2010 | Ihrke et al. |
| 8,029,414 | B2 | 10/2011 | Ingvast et al. |
| 8,056,423 | B2 * | 11/2011 | Abdallah et al. ............... 73/826 |
| 2003/0221238 | A1 | 12/2003 | Duboff et al. |
| 2010/0152898 | A1 | 6/2010 | Reiland et al. |
| 2010/0280659 | A1 | 11/2010 | Abdallah et al. |

(Continued)

FOREIGN PATENT DOCUMENTS

| | | |
|---|---|---|
| JP | S56156155 A | 12/1981 |
| JP | 2009022577 A | 2/2009 |

*Primary Examiner* — Yolanda Cumbess
(74) *Attorney, Agent, or Firm* — Quinn Law Group, PLLC

(57) ABSTRACT

A grasp assist system includes a glove and a flexible sleeve. The glove includes a digit such as a finger or thumb, a force sensor configured to measure a grasping force applied to an object by an operator wearing the glove, and adjustable phalange rings positioned with respect to the digit. A saddle is positioned with respect to the finger. A flexible tendon is looped at one end around the saddle. A conduit contains the tendon. A conduit anchor secured within a palm of the glove receives the conduit. The sleeve has pockets containing an actuator assembly connected to another end of the tendon and a controller. The controller is in communication with the force sensor, and calculates a tensile force in response to the measured grasping force. The controller commands the tensile force from the actuator assembly to tension the tendon and thereby move the finger.

17 Claims, 3 Drawing Sheets

(56) References Cited

U.S. PATENT DOCUMENTS

2010/0280662 A1  11/2010  Abdallah et al.
2011/0071664 A1*  3/2011  Linn et al. .................... 700/213
2011/0071678 A1  3/2011  Ihrke et al.

* cited by examiner

HUMAN GRASP ASSIST DEVICE SOFT GOODS

STATEMENT REGARDING FEDERALLY SPONSORED RESEARCH OR DEVELOPMENT

This invention was made with government support under NASA Space Act Agreement number SAA-AT-07-003. The invention described herein may be manufactured and used by or for the U.S. Government for U.S. Government (i.e., non-commercial) purposes without the payment of royalties thereon or therefor.

TECHNICAL FIELD

The present disclosure relates to soft goods/packaging of a human grasp assist device.

BACKGROUND

Ergonomics is an evolving scientific discipline that ultimately seeks to understand and improve human interactions with the various pieces of equipment used within a work environment, e.g., keyboards, workstations, torque wrenches, control input devices, and the like. Good ergonomic design practices seek to optimize aspects of the physical work environment as they relate to the human operators working therein. However, certain work tasks may stress an operator in a manner that cannot be lessened by even the most optimal of ergonomic workplace configurations.

For example, manual operations requiring a repetitive or sustained grasping of an object can stress an operator's hands, fingers, and forearms. As a result, an operator's grasp strength and productivity can gradually decline over the course of a work day. Grasp strength can also vary widely between different operators due to differences in physical stature, injury, and/or muscle fatigue. The variable nature of a given operator's grasp strength may result in relatively inefficient execution of certain grasp-related work tasks. Conventional devices such as wrist straps and braces exist for easing some of the stress on an operator. However, such devices may remain less than optimal for improving overall grasp strength.

SUMMARY

A grasp assist device is disclosed herein that a human operator may use for increased grasp strength and/or rehabilitation. The comfort and functionality of such a device may be improved using the packaging or soft goods set forth herein. The present device includes a glove that is worn on the operator's hand and a sleeve that is worn on the operator's forearm. The device may include one or more flexible tendons that are selectively tensioned with a calculated tensile force by a corresponding actuator assembly. The actuator assembly pulls as needed on the tendon(s) to help close one or more digits of the glove, and thus of the operator's hand contained therein, into a desired grasp pose. In an alternative embodiment the tendon(s) may be routed so as to help open the operator's hand when releasing the grasp pose, i.e., grasp release assistance. Force sensors positioned with respect to the glove provide force feedback signals to a controller contained in the sleeve. The controller commands the calculated tensile force to thereby place one or more of the tendons under tension.

In particular, a grasp assist device in one embodiment includes a glove having a digit, i.e., a finger or a thumb, and a force sensor positioned with respect to the glove. The force sensor measures a grasping force applied to an object by an operator wearing the glove. The glove includes adjustable phalange rings and a saddle positioned with respect to the digit, a flexible tendon having one end connected to the saddle, and a conduit containing the tendon. The glove also includes a conduit anchor positioned on or within the glove. The conduit anchor receives the conduit and prevents undesired axial motion of the conduit toward the fingers when the tendon is under tension.

The grasp assist device in this embodiment also includes a flexible sleeve. The sleeve has pockets containing an actuator assembly and a controller. The actuator assembly is connected to another end of the tendon. The controller, which is communication with the force sensor and the actuator assembly, calculates a tensile force to apply to the tendon in response to the measured grasping force, and then commands the calculated tensile force from the actuator assembly.

In other embodiments, a thumb and/or multiple fingers may be moved via the tendons. The force sensor may be positioned with respect to the palm of the glove or any of the fingers/thumb. Reinforcement of the conduit anchor may be provided via one or more inelastic or non-stretchable straps, whether extending between the glove and the sleeve or wrapping around the glove near the palm. The saddle may be arcuate, and may define an arcuate groove which receives the tendon such as by looping the tendon around the saddle and seating the tendon in the groove. The tendon may be spliced to itself adjacent to the saddle to form a loop through which a digit of the glove is inserted. An optional tension sensor may be positioned with respect to the conduit, for instance in the conduit anchor adjacent to the conduit, and configured to measure an actual tensile force acting on the conduit, e.g., in a rehabilitation mode.

The above features and advantages and other features and advantages of the present invention are readily apparent from the following detailed description of the best modes for carrying out the invention when taken in connection with the accompanying drawings.

DETAILED DESCRIPTION

Figure 1:
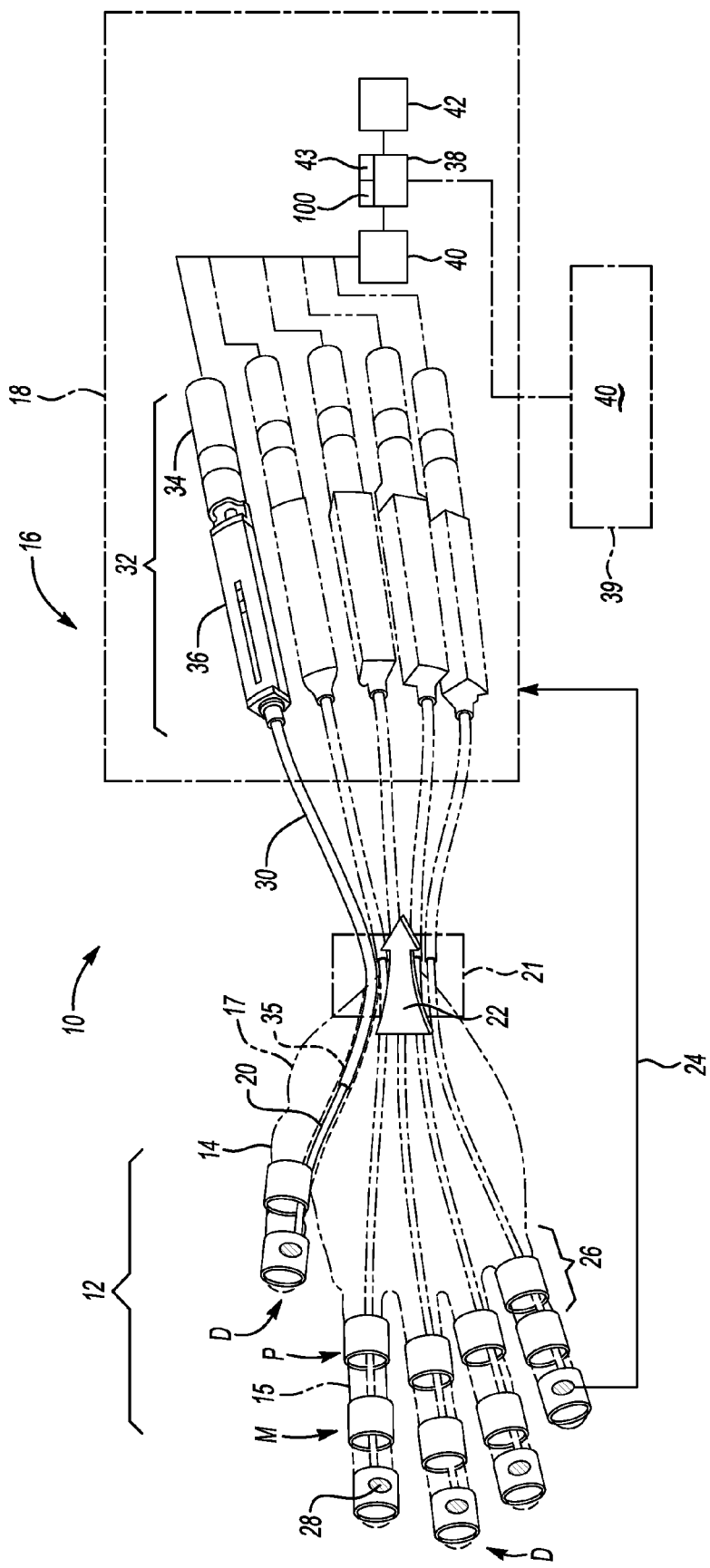
FIG. 1 is a schematic illustration of an example grasp assist device having a glove, a sleeve, and a controller.

With reference to the drawings, wherein like reference numbers refer to the same or similar components throughout the several views, an example grasp assist system 10 is shown in FIG. 1. The grasp assist device 10 includes a glove 12 and a flexible sleeve 18. When worn by an operator, the grasp assist system 10 assists the operator in grasping an object. The grasp assist device 10 includes various soft goods as explained herein with reference to FIGS. 2 and 3, i.e., natural or synthetic materials that improve the fit, comfort, and performance of the grasp assist device 10.

Figures 2, 3:
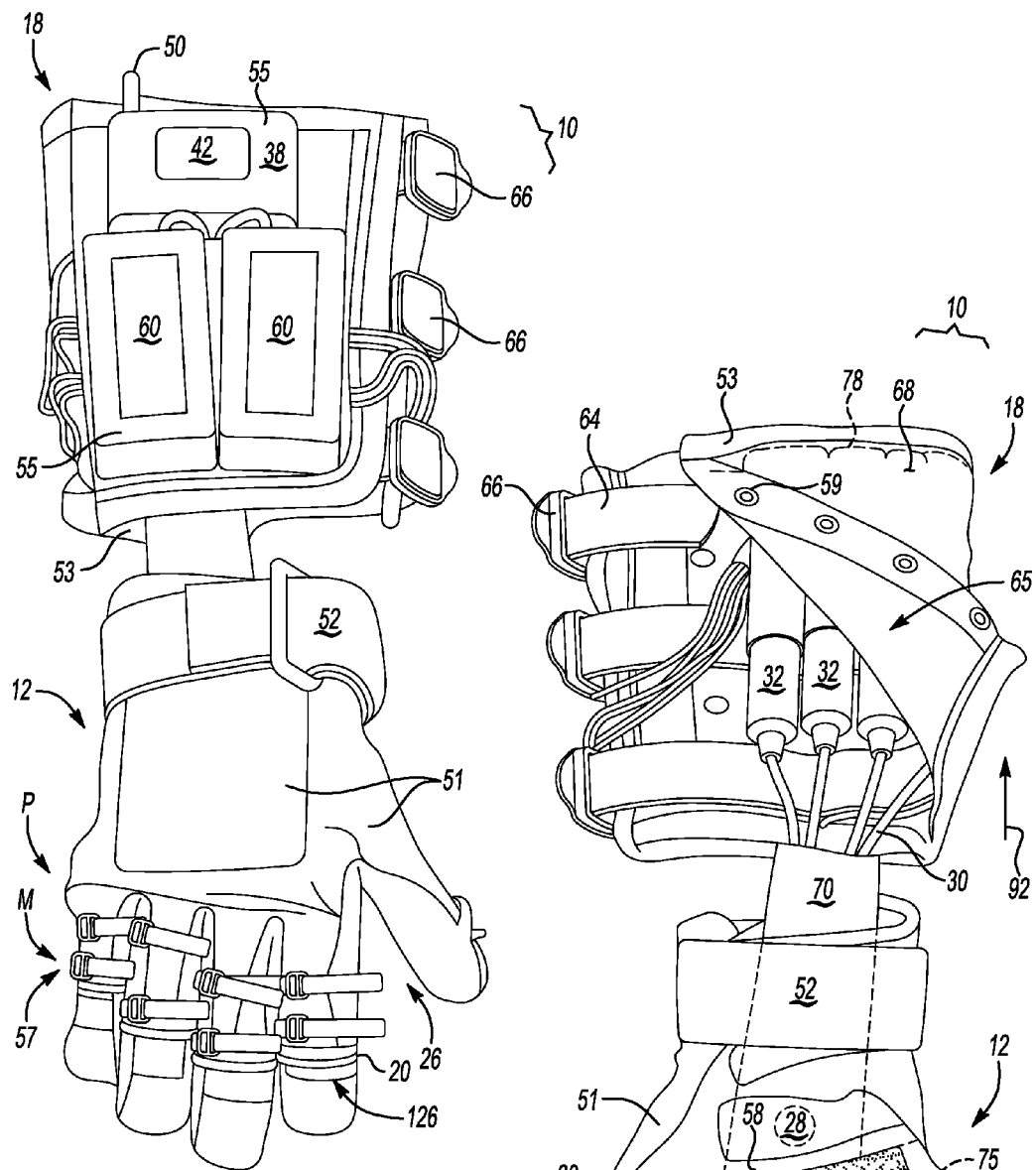
FIG. 2 is a schematic top view illustration of the example grasp assist device shown in FIG. 1.
FIG. 3 is schematic bottom view illustration of the example grasp assist device shown in FIGS. 1 and 2.

The electro-mechanical operational components or hard goods of the grasp assist device 10 shown in FIG. 1 may include a set of actuators, for instance a tendon drive system (TDS) 16 in one possible embodiment. The TDS 16 may be fully enclosed or contained at least partially within the sleeve 18. The TDS 16 may be linked to the glove 12 via one or more flexible tendons 20, for example braided polymers, with an augmenting tensile force (arrow 22). The tensile force (arrow 22) is calculated by a controller 38 in response to force feedback signals 24 from one or more force sensors 28 positioned with respect to the glove 12, e.g., on fingers 15 and/or a thumb 14 thereof, or on a palm 58 of the glove 12 as shown in FIG. 3. The calculated tensile force (arrow 22) is then applied to some or all of the tendons 20 by the TDS 16.

The glove 12 may include one or more digits, for instance the thumb 14 and one or more fingers 15. A full four-finger/one thumb glove may be used as shown, or a glove 12 may be envisioned having fewer fingers 15 or no thumb 14 in other embodiments. The intended grasp pose would determine the particular design of the glove 12. For example, a grasp pose in which a small object is pinched by an operator may only require a glove 12 having a thumb 14 and one finger 15, e.g., an index finger, while a full-handed grasp of an object may require a four-fingered glove with a thumb 14.

An operator may wear the glove 12 in the manner of a conventional glove. The phalange rings 26 of FIG. 1 are shown schematically. As described below with respect to FIGS. 2 and 3, some of these phalange rings 26 may be flexible and adjustable. Others may form non-adjustable saddles 126 as described below with reference to FIGS. 5 and 6.

When the glove 12 of FIG. 1 is worn on an operator's hand, each of the phalange rings 26 may at least partially circumscribe a respective one of the thumb 14 and fingers 15 of the glove 12, and thus the operator's own thumb and fingers, or the rings 26 may be positioned within the material 17 defining the thumb 14/fingers 15 depending on the embodiment. Thus, any tensile force (arrow 22) applied to some or all of the tendons 20 routed through the phalange rings 26 of the glove 12 can indirectly act on an operator's fingers/thumb through a reaction force with respect to the phalange rings 26.

In general, a threshold grasping force exerted by an operator on an object held in the operator's grasp activates any of the force sensor(s) 28 that are in contact with the object. The phalange rings 26 are connected to or in contact with the tendons 20 that run through the phalange rings 26, with at least some of the phalange rings 26 thus acting as guides for the tendons 20. The phalange rings 26 may be distal (arrow D), i.e., positioned at the distal end of a finger 15 or thumb 14, medial (arrow M), i.e., positioned at the medial joint of the finger 15 or thumb 14, or proximal (arrow P, i.e., positioned at the proximal joint of the finger 15 or thumb 14. Each of the tendons 20 terminates at a phalange ring 26, such as the distal (arrow D) phalange rings 26 as shown in FIG. 1, or a medial phalange ring 26 as shown in FIGS. 2 and 3. Where the tendons 20 terminate, a saddle 126 (see FIGS. 2, 5, and 6) may be used to loop the tendon 20 back onto itself into position for rope splicing or other connection as described below.

The TDS 16 of FIG. 1 is connected to one end of a corresponding one of the tendons 20. Each tendon 20 is disposed and freely moveable within a conduit 30. The conduit 30 may be substantially rigid in the compressive direction and flexible in other directions, e.g., a stainless steel coil. In one embodiment, each of the tendons 20 may be configured as a braided polymer, which in turn may include a suitable fluorocarbon that increases the wear life of each tendon. However, other materials may also be used without departing from the intended scope of the invention.

The tendons 20 may pass through an optional tendon concentrator 21, which is shown schematically in FIG. 1. The tendon concentrator 21 may be located on or near the base of the palm or a wrist area of the operator. As shown in phantom, multiple actuator assemblies 32, for instance motorized ball screw devices or linear actuators to which the tendons 20 are attached, may be configured in an array within the TDS 16. Each actuator assembly 32 acts on a corresponding tendon 20. When only one TDS 16 is used, the tendon concentrator 21 may be used to connect the tendons 20 leading from a thumb 14 and each finger 15 to a single actuator tendon, i.e., the tendon 20 shown via solid lines in FIG. 1. The tendon concentrator 21 in this instance provides an area for the multiple tendons 20 to be connected to a single tendon 20.

Still referring to FIG. 1, the actuator assembly 32 according to a particular embodiment may include a servo motor 34 and a drive assembly 36, for example a ball and screw-type device according to one embodiment. Other embodiments are possible, e.g., linear actuators, motorized spools, etc. Operational control of the TDS 16 is provided via the controller 38. The controller 28 may draw any required power from an energy supply 40. The energy supply 40 may be part of an integrated electronics package 60 as shown in FIG. 2 and described below, or it may be a larger unit worn external to the sleeve 12, such as on an optional belt pack 39. Use of the belt pack 39 may enable a larger energy supply 40. The energy supply 40 may be configured as a battery pack, for instance a lithium ion cell or cells, or any other relatively lightweight or low-mass energy storage device.

A user interface 42 may be connected to the sleeve 18 in signals communication with the controller 38, or it may be an integral part of the controller 38. The user interface 42 may be used to facilitate selection of a desired operating mode, and therefore may be configured as an operator-accessible control panel, a touchpad, or a touch screen allowing an operator to interface with the controller 38. The controller 38 of FIG. 1 processes the set of feedback signals (arrow 24). Computer-executable code 100 may be recorded on tangible, non-transitory memory 43 of the controller 38 and executed thereby to calculate and select an optimal augmenting tensile force (arrow 22) in response to the values relayed via the feedback signals (arrow 24) and the user-selected operating mode, as well as to provide other control actions as set forth below with reference to FIG. 3. This augmenting tensile force (arrow 22) is then applied to some or all of the tendons 20 using the drive assembly 36 to assist the grasp of an operator wearing the grasp assist device 10.

The controller 38 of FIG. 1 may include one or more integrated circuits, which may be augmented by various electronic devices such as voltage regulators, capacitors, drivers, timing crystals, communication ports, etc. The controller 38 may be a microcontroller using limited power and limited read only memory (ROM), random access memory (RAM), and/or electrically-programmable read only memory (EPROM), and any required input/output (I/O) circuit devices, as well as signal conditioning and buffer electronics. A central processing unit is used to provide the required processing power. Individual control algorithms resident in the controller 38 or readily accessible thereby may be stored in, e.g., ROM, and automatically executed at one or more different control levels to provide the respective control functionality.

Referring to FIGS. 2 and 3, the soft goods portions of the upper surfaces (FIG. 2) and lower surfaces (FIG. 3) of the grasp assist device 10 of FIG. 1 are shown in further detail.

The structural elements described hereinafter are configured to package and support the controller 38, the TDS 16, and the force sensor(s) 28 of FIG. 1 in a comfortable manner, i.e., the hard goods or electromechanical operating components of the grasp assist device 10. As the grasp assist device 10 may be worn by an operator for an extended period of time, treatment of heat and moisture are principle design concerns, as are reduced weight, tactile comfort, and ease of wear.

Any portions of the grasp assist 10 which directly contact the human operator while in use may be constructed of a suitable synthetic, breathable fiber such as elastane or perforated Lycra®. With reference to FIG. 2, such surfaces may include the backside 51 of the glove 12 as well as internal surfaces 53 of the sleeve 18. The sleeve 18 may also include pockets 55, which may be constructed at least partially out of neoprene or nylon mesh in possible embodiments.

The pockets 55 may contain the controller 38, the user interface 42, and the associated integrated electronics package 60, for example wiring, power conditioning components, and drivers for safely and reliably powering the grasp assist device 10. If a remote user interface 42 is used such as a tablet computer, a human machine interface, or another suitable input device, the user interface 42 shown in FIG. 2 may include a display screen presenting the particular control option selected via the remote device.

The controller 38, user interface 42, and integrated electronics package 60 may be sewn or otherwise secured in place via the pockets 55. A wireless interface 50 for the controller 38 may extend from the top of the sleeve 18 as shown when wireless connectivity is included as part of the controller 38. The wireless interface 50 may be used to communicate with remote devices such as a database management system for tracking use and performance of the device 10. Buckles 66 may be used to secure the sleeve 18 to an operator's forearm, thus allowing the grasp assist device 10 to be adjusted as needed to fit multiple different operators.

The glove 12 of FIG. 2 may also include an adjustable wrist strap 52, e.g., nylon and Velcro® or other suitable material. The wrist strap 52 serves two main functions. The first function is securing of the glove 12 to the operator's hand. The second function of the wrist strap 52 is reinforcement of the conduit anchor 62 of FIG. 3 and added restraint against undesired axial motion of the conduits 30 shown in FIGS. 1, 3, and 4 as discussed below.

Also shown in FIG. 2 are the phalange rings 26. Some of the phalange rings 26 may be adjustable. Any phalange rings 26 that are adjustable, e.g., the proximal (arrow P) and medial (arrow M) phalange rings 26 in the example embodiments shown in FIGS. 2 and 3, may be constructed of nylon or another suitable rugged and flexible material. The phalange rings 26 keep the tendons 20 routed in close proximity to the operator's finger/thumb in the glove 12, and also transmit the tensile force (arrow 22 of FIG. 1) to the backs of the proximal (arrow P) and medial (arrow M) phalanges of the glove 12. Adjustment of the phalange rings 26 may be provided via an adjustment feature 57, such as a tab and loop or a belt buckle-like configuration as shown, to allow operators to customize the fit with respect to the operator's fingers/thumb.

The medial phalange (arrow M) may be used to secure the tendon 20 via a saddle 126, whereon an end of one of the tendons 20 is connected or routed with respect to the saddle 126. An example saddle 126 is described below with reference to FIGS. 5 and 6. The distal phalange (arrow D of FIG. 1) could be used to terminate the tendon 20 in other embodiments.

Figure 6:
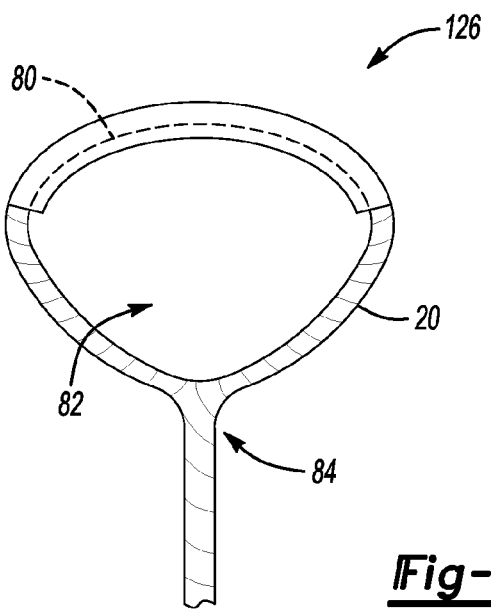
FIG. 6 is a schematic side view illustration of the example saddle of FIG. 5 with a tendon seated therein.

The saddle 126 used to terminate a given tendon 20 may form complete rings as shown in FIG. 1, or may be an incomplete circle or arcuate as shown in FIG. 6. The saddles 126 may be constructed from a suitable rigid material, for instance aluminum or hard plastic. In other embodiments, the saddles 126 may be constructed of a softer material such as an elastomer, or a combination of aluminum and elastomer, which may provide for added comfort without sacrificing strength. The saddles 126 may be seated on the outside of the glove 12 on rings or pads of leather or any other suitable material.

Referring to FIG. 3, the grasp assist device 10 is shown from a bottom or palm-side view. The palm 58 of the glove 12 may be formed from a suitably rugged and wear-resistant material such as leather or suede. A conduit anchor 62 such as a shaped hard plastic or metal plate may be sewn or otherwise connected to the glove 12, for example inside of the palm 58 when grasp assistance is used. When assistance is provided only upon release of a grasp, the anchor 62 may be placed on the back of the glove 12. The conduit anchor 62 should be strong enough to prevent the conduits 30, which should be rigid in the axial/compressive direction with respect to an axis of the conduits 30, from pushing through the conduit anchor 62 and toward the ends of the fingers 15 when the tendons 20 (see FIG. 1) are under tension. In other words, the conduit anchor 62 may be sufficiently rigid in the axial direction of the conduits 30, but not necessarily rigid in other directions. For instance, some bending of the conduit anchor 62 in the direction of a cupping of the operator's palm may improve the operator's comfort, and may feel more natural to the operator in executing a given grasp pose.

In one possible embodiment, the conduits 30 may extend as far as the crease in the operator's palm, i.e., the point where the joints of the proximal (P) phalanges bend. The conduit anchor 62 in such an embodiment should be placed at the same location, which is the position shown in the example embodiment of FIG. 3. To secure the conduit anchor 62 in place with respect to the glove 12, a strap 70 may be used that is constructed of a substantially inelastic or non-stretchable material, e.g., nylon or canvass. The strap 70 may extend from the sleeve 12 to the conduit anchor 62, and maybe connected to the conduits 30. The adjustable wrist strap 52 may circumscribe the strap 70 and reinforce the strap 70 when the adjustable wrist strap 52 is tightened.

The strap 70 may be stitched, riveted, or otherwise firmly secured to the material 17 (see FIG. 1) of the glove 12, such that the strap 70 resists motion of the conduits 30 toward the fingers 15 when the tendon 20 is tensioned. The conduit anchor 62 may also be secured laterally with respect to the glove using another strap 75 which wraps at least partially around the glove 12 inside of the glove 12. The additional non strap 75, like the strap 70, may be inelastic, and may be securely attached to the glove 12 via stitches, rivets, or other suitable means.

The sleeve 18 of FIG. 3 may include one or more forearm straps 64. The forearm straps 64 may be tightened and buckled via the buckles 66, and/or using Velcro closures, so as to secure the sleeve 18 to a forearm of an operator. Likewise, the glove 12 may include the wrist strap 52 noted above with reference to FIG. 2. Tightening of the wrist strap 52 firmly secures the strap 70 with respect to an operator's wrist. In this manner, the conduit anchor 62 is prevented from moving in response to motion of the conduits 30.

The sleeve 18 may also include a protective flap 68. To protect the actuator assemblies 32 of the sleeve 18, the protective flap 68 may be folded over the actuator assemblies 32 in the direction of arrow 65 and secured via fasteners 59, e.g., snaps, Velcro®, zippers, etc. Motion of the actuator assemblies 32 in response to motion of the conduits 30 may cause the actuator assemblies 32 to move away from the glove 12 in the direction of arrow 92. To restrain this motion, reinforced pockets 78 may be provided in the sleeve 12 beneath the flap 68. The actuator assemblies 32 may be seated within the reinforced pockets 78. Thus, any motion of the actuator assemblies 32 in the direction of arrow 92 may be restrained by the reinforced pockets 78.

The force sensor(s) 28 may be positioned on the palm side of the glove 12 as shown, e.g., on a distal end, medial portion of the thumb 14, or on the palm 58 as shown in FIG. 3, or alternatively one or more of the fingers 15. Thus, when an object is grasped in a hand of an operator wearing the glove 12, with sufficient pressure applied to the force sensor(s) 28, the controller 38 can activate the glove 12 as explained above with reference to FIG. 1.

Figure 4:
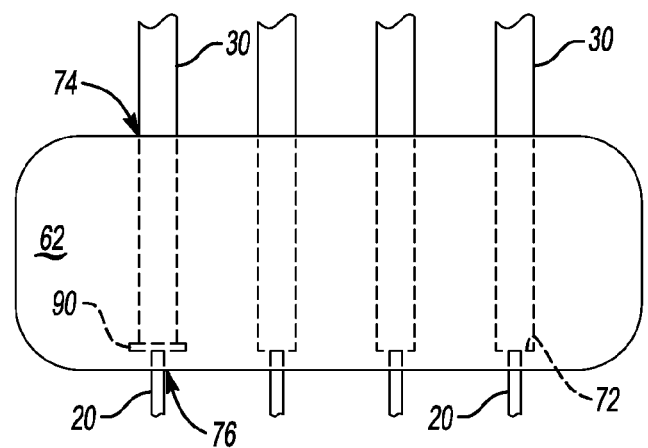
FIG. 4 is a schematic plan view illustration of an example conduit anchor usable with the glove of FIGS. 2 and 3.

Referring to FIG. 4, an example embodiment of the conduit anchor 62 is shown for four conduits 30. Fewer conduits 30 may be used without departing from the intended inventive scope. The conduit anchor 62 may define bores or through channels each having a first opening 74 and a second opening 76. The first opening 74 should be slightly larger than the outside diameter of the conduit 30 to allow a snug fit without impinging the conduit 30. Likewise, the second opening 76 is slightly larger than the outside diameter of the tendon 20. The anchor 62 may be a solid piece of plastic, for example, with a bore defining first openings 74 formed from one end of the anchor 62, and a bore defining the second opening 76 formed from another end of the anchor 62 coaxially with the first bore.

The conduits 30, which as noted above are rigid in the compressive or axial direction, contact an internal surface 72 of the conduit anchor 62, thereby bottoming out on the surface 72. Proper restraint of the conduit anchor 62 as explained above with respect to the straps 70, 75 of FIG. 3 thus allows undesired motion of the conduits 30 to be arrested at the conduit anchor 62.

In a particular embodiment, the glove 12 of FIGS. 1-3 may be used for rehabilitation, such as when an operator has suffered an injury which has weakened the operator's grasp strength. Augmentation of the grasp strength may be provided as set forth above. However, it may be desirable to monitor the operator's grasp strength and track changes in the grasp strength as the operator undergoes therapy. The construction of the conduit anchor 62 is conducive to this.

A tendon tension sensor 90 of the type known in the art may be positioned with respect to a conduit 30 at the interface between the conduit 30 and the surface 72. The sensor 90 is shown schematically in FIG. 4, and may include structure which circumscribes the conduit 30. The sensor 90 may include, for example, strain gauges which measure a conduit compressive force acting on the sensor 90 whenever the tendon 20 is under tension. The sensor 90 can then communicate the measured strain to the controller 38, e.g., wirelessly via the wireless interface 50 shown in FIGS. 2 and 3.

Measurements taken by the sensor 90 may be translated into actual tensile force measurements by the controller 38. In turn, these tensile force measurements may be recorded and tracked by the controller 38 to evaluate progress of an operator's changing grasp strength, with or without augmentation via the actuator assemblies 32. A different sensor 90 could be used with each conduit 30 to precisely track progress of an operator's grasp strength with respect to each of the operator's fingers 15 and thumb 14.

As an illustrative example, an injured operator may grasp an object while wearing the grasp assist device 10 of FIGS. 2 and 3. The force sensor(s) 28 may be initially deactivated. The configuration of FIGS. 2 and 3 enabled grasp assist. However, one of ordinary skill in the art will appreciate that by simply reversing the position of the actuator assemblies 32/tendons 20 one can assist the release from a grasp rather than the grasp itself. That is, the tendons 20 could be routed to act on the back of the fingers 15 of FIG. 3 so as to release the grasp rather than the palm-side of the fingers 15 to form the grasp. In such an embodiment, the tensile force of an operator forming the grasp can be measured by the sensor 90 of FIG. 4. Over time, the operator's grasp or release strength, depending on the embodiment, can be measured and tracked to determine rehabilitation progress.

Figure 5:
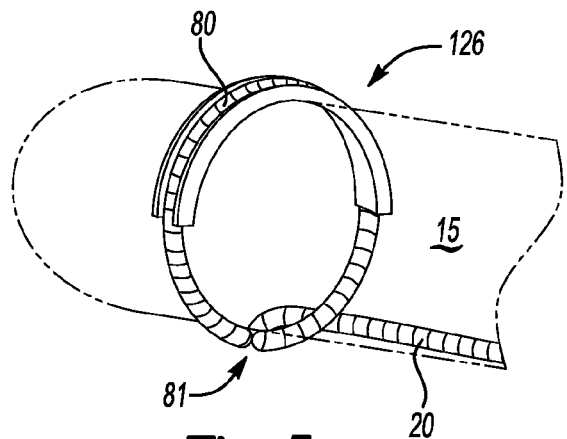
FIG. 5 is a schematic perspective view illustration of an example saddle usable with the glove of FIGS. 2 and 3.

Referring to FIGS. 5 and 6, an example saddle 126 for securing the tendon 20 to a desired portion of the finger 15 or thumb 14 of the glove 12 may define an arcuate groove 80 that is sized and shaped to receive a tendon 20. For instance, the tendon 20 emerges from a digit of the glove 12 at location 81 of FIG. 5 and wraps around the saddle 126 as shown in FIGS. 2, 5, and 6. The saddle 126 may be detached from the glove 12, in which case the saddle 126 rests on the glove 12, or the saddle 126 may be attached to the glove 12 via stitching or other means. As best shown in FIG. 6, the tendon 20 forms a loop 82 around the saddle 126 such that the tendon 20 is received by/seated in the groove 80.

After wrapping around the saddle 126 the tendon 20 wraps back onto and attaches to itself to form a splice 84. Various rope splicing techniques exist for forming the splice 84. For instance, the tendon 20 may be interwoven with itself at the location of the splice 84. Tension on the tendon 20 acts over time to tighten this interweave, thus strengthening the splice 84 over time as is understood in the art. Other splicing or knotting techniques may be used to secure the tendon 20 to the saddle 126 without departing from the intended inventive scope. Additionally, the saddle 126 may form a complete ring shape (see the rings 26 of FIG. 1) rather than the arcuate shape of FIG. 6. In such an embodiment, the groove 80 of FIGS. 5 and 6 may still be used, or the tendon 20 may be knotted, spliced, or otherwise connected to the saddle 126 rather than looped around the saddle 126 as shown in FIG. 6.

While the best modes for carrying out the invention have been described in detail, those familiar with the art to which this invention relates will recognize various alternative designs and embodiments for practicing the invention within the scope of the appended claims.

The invention claimed is:
1. A grasp assist system comprising:
a glove having:
 a digit selected from the group consisting of a finger and a thumb;
 a force sensor positioned with respect to the glove that is configured to measure a grasping force applied to an object by an operator wearing the glove;
 a plurality of adjustable phalange rings positioned with respect to the digit;
 a saddle positioned with respect to the digit;
 a flexible tendon that is looped at one end around the saddle;
 a conduit that at least partially contains the tendon; and
 a conduit anchor secured to the glove, wherein the conduit is received within the conduit anchor and prevented from moving in an axial or compressive direction by the conduit anchor; and
a flexible sleeve having pockets containing:
 an actuator assembly connected to another end of the tendon; and
 a controller in communication with the force sensor, wherein the controller is configured to calculate a tensile force in response to the measured grasping force, and to command the tensile force from the actuator assembly to thereby tension the tendon and thereby move the digit.

2. The system of claim 1, wherein the adjustable phalange rings are constructed of nylon.

3. The system of claim 1, wherein the conduit anchor defines a first opening which receives the conduit and a second opening through which the tendon passes.

4. The system of claim 1, wherein the saddle is arcuate and defines a groove in which the tendon is seated.

5. The system of claim 1, wherein the sleeve includes a reinforced pocket in which the actuator assembly is seated.

6. The system of claim 1, wherein the glove is constructed at least partially of elastane fiber.

7. The system of claim 1, wherein the flexible sleeve includes a flap which covers the actuator assembly.

8. The system of claim 1, wherein the controller includes a user interface positioned in one of the pockets of the flexible sleeve.

9. The system of claim 1, wherein the glove further includes an adjustable wrist strap.

10. The system of claim 9, further comprising an additional strap that is inelastic, and that extends between the conduit anchor and the sleeve, wherein:
the additional strap is connected to the conduit; and
the adjustable wrist strap circumscribes the additional strap and reinforces the additional strap when the adjustable wrist strap is tightened.

11. The system of claim 1, wherein the conduit is rigid in the compressive direction.

12. The system of claim 1, further comprising a tendon tension sensor positioned with respect to at least one of the conduits at an interface between the conduit and an internal surface of the conduit anchor, wherein the tendon tension sensor measures an actual tensile force acting on the at least one conduit and transmits the measured actual tensile force to the controller.

13. A grasp assist system comprising:
a glove constructed at least partially of elastane fiber, and having:
a plurality of fingers;
a thumb;
a force sensor positioned with respect to the thumb, wherein the force sensor is configured to measure a grasping force applied to an object by an operator wearing the glove;
an adjustable wrist strap;
a plurality of adjustable phalange rings, wherein a different pair of the adjustable phalange rings is positioned with respect to the proximal and medial phalanges of a corresponding one of the fingers;
a plurality of arcuate saddles, wherein a different one of the saddles is positioned at one of the medial and the distal phalanges of the corresponding fingers;
flexible tendons each having a first end connected to a corresponding one of the saddles;
a plurality of conduits, wherein each of the conduits contains a corresponding one of the tendons; and
a conduit anchor attached to the glove, wherein the conduit plastic anchor receives the conduits therein via a first set of openings and allows the tendons to pass through the conduit anchor via another set of openings; and
a flexible sleeve that is wearable on a forearm of the operator, wherein the sleeve includes:
a plurality of motorized actuator assemblies, wherein each of the assemblies is connected to a second end of a corresponding one of the flexible tendons and is contained in a pocket of the sleeve; and
a controller in communication with the force sensor, wherein the controller is configured to calculate a tensile force in response to the measured grasping force, and to command the tensile force from at least one of the actuator assemblies.

14. The system of claim 13, wherein the controller includes a user interface which is positioned in one of the pockets of the flexible sleeve.

15. The system of claim 13, wherein each of the saddles defines an arcuate groove in which a corresponding one of the tendons is seated, and wherein each of the saddles rests on a corresponding one of the fingers.

16. The system of claim 13, further comprising a tendon tension sensor positioned with respect to at least one of the conduits at an interface between the at least one conduit and an internal surface of the conduit anchor, wherein the tendon tension sensor is configured to measure an actual tensile force of a tendon and communicate the measured actual tensile force to the controller.

17. The system of claim 13, further comprising an inelastic strap extending between the conduit anchor and the sleeve, wherein:
the inelastic strap is connected to the conduit; and
the adjustable wrist circumscribes the inelastic strap and reinforces the inelastic strap when the adjustable wrist strap is tightened.

* * * * *